Figure 1:
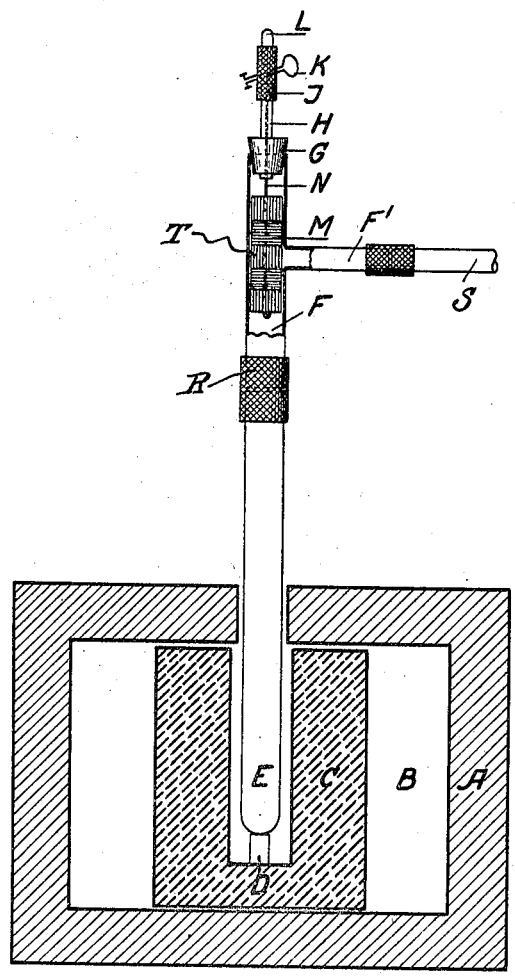

July 23, 1929.　　　R. GEIPERT　　　1,721,813
METHOD OF AND APPARATUS FOR TESTING COAL
Filed Oct. 7, 1926　　　2 Sheets-Sheet 1

Inventor:
Rudolf GEIPERT
by:
Lowe, Kehlenbeck & Farley
Attorneys.

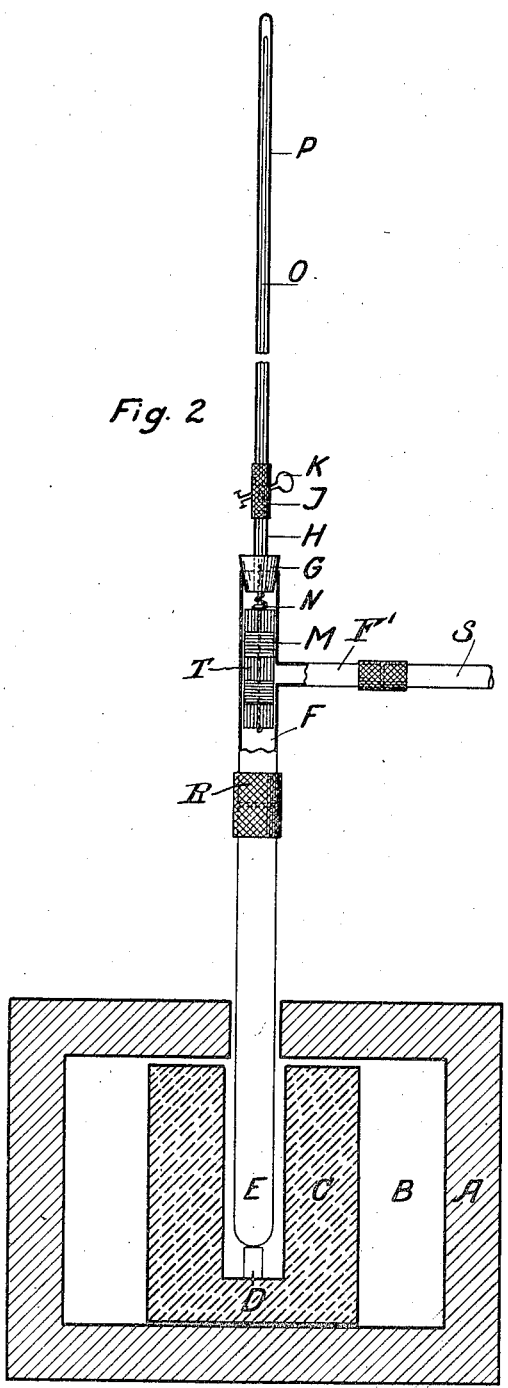

Patented July 23, 1929.

1,721,813

UNITED STATES PATENT OFFICE.

RUDOLF GEIPERT, OF BERLIN-MARIENDORF, GERMANY.

METHOD OF AND APPARATUS FOR TESTING COAL.

Application filed October 7, 1926. Serial No. 140,044, and in Germany March 4, 1926.

My invention relates to improvements in the method of an apparatus for testing coal, and more particularly in the method of ascertaining the properties of the coal which are important in the gasification thereof in furnaces.

As is known to those skilled in the art, the gasification of coal in gas or coal works is subject to different conditions according to the character of the coal. Therefore, it is important to ascertain the properties of the coal prior to subjecting the same to gasification. As now practised the properties are ascertained merely by the experiences of the practical operation, which method is expensive and unreliable. The chemical analysis of the coal cannot be applied for testing the coal because the results are unsatisfactory. It has therefore been tried to determine the properties of the coal in laboratories and on a small scale by gasifying small amounts of coal. But the result has been unsatisfactory and unreliable, and it could not be used as the basis for the practical operation on a large scale.

The object of the improvements is to provide a method of testing coal in laboratories which requires gasification of a few grammes of coal, and which gives good results permitting samples of coal of different character to be compared, and agreeing with the gasification on a large scale in furnaces.

In order that a few grammes of coal and at the most one kilogram thereof correspond to the average character of a large mass of coal, the coal is tested in a powderous state after being thoroughly dried, because when in a humid state the coal cannot be ground to the desired degree of fineness, and it is impossible to measure exact amounts thereof. In my improved method the dry coal powder is compressed into hard bricks, and the said bricks are placed into a suitable testing apparatus which previously has been heated to gasifying temperature. In this method it is important that the bricks are simultaneously brought into the glowing gasification chamber, such as a glowing quartz tube, in order that gasification be simultaneously started. Further, the bricks must always be disposed within the said pipe in the same and regular way. Finally, the bricks must be hard and dry, because otherwise the amount and the gasification are not sufficiently exact.

I have found that the gasification of the coal within the testing apparatus depends on the free space which is not filled out by the bricks, and on the temperature of the said chamber. When loosely placing the bricks into the gasification chamber the space left free thereby is different from the space left free when closely placing the same into the said chamber. By filling the bricks into the gasification chamber in a regular way uniform and reliable results are obtained, and for this reason I place only one brick into the chamber, or I combine several bricks into a closed package. Thus the free space between adjacent bricks and between the bricks and the wall of the chamber is made uniform. But further attention must be paid to the heated free space above the bricks, which space is provided for insuring uniform gasification of the uppermost bricks and for decomposing the gas and vaporous tar. Therefor the size of this space has a certain influence on the result of the gasification, and it should always be alike. The inaccuracy caused by non-uniformity of the said space is the smaller the longer the length of the portion of the space filled out by bricks as compared to the inner diameter of the gasification chamber. I have found that the length of the portion of the gasification chamber filled up by the bricks should be at least the double of the inner diameter of the said chamber.

The heated free space provided within the gasification tube above the bricks is frequently reduced in size by the expansion of the bricks caused by the pressure of the gases produced by the gasification, in which case the bricks partly or entirely fill up the said space and in some cases are shifted into the non-heated portion of the tube, where the gasification is interfered with. Therefore I provide means for preventing expansion of the bricks during gasification. For example I compress the bricks so far that expansion in longitudinal direction is prevented. This may be done for example by means of a rod made from quartz glass, iron or the like.

I have found that uniform heating is not insured when the flame is in direct contact with the gasification tube or chamber, because the temperature of the flame is not uniform. Therefore I prefer to dispose the tube within a jacket made from a suitable insulating material such as chamotte, the flame acting on the outside of the said jacket, which therefore compensates the variation of the flame and transmits the heat to the gasification tube.

In the preferred form of the method I provide a jacket the thickness of which is such that it is capable of storing sufficient heat for completing the gasification after interrupting heating. In this case the jacket and the gasification tube are first heated to the desired temperature, and after removing the flame the bricks are put into the glowing gasification tube, or I remove the flame immediately after placing the bricks into the tube. Thus the bricks are heated exclusively by means of the heat stored within the jacket.

For the purpose of explaining the invention two apparatus in which the method is preferably performed have been shown in the accompanying drawing, in which Fig. 1, is a sectional elevation of the apparatus, and Fig. 2, is a similar sectional elevation showing a modification.

In the example shown in Fig. 1 my improved apparatus consists of a gasification chamber E in the form of a vertical tube made from quartz, a jacket C surrounding the bottom part of the tube E, a container A enclosing the jacket C and providing a heating chamber B, and a tubular member F connected with the tube E by a sleeve R of rubber or the like and having a lateral branch $F^1$. The jacket C is made from chamotte, and the tubular member F, $F^1$ from glass. At its top the tubular member F is closed by a stopper G made from rubber and having a glass pipe H passed through a bore thereof. The lateral branch $F^1$ is connected with a pipe S. Through the glass pipe H a wire N of platinum is passed into the tubular member F, which wire is adapted to hold the coal bricks M placed thereon. The said wire is fixed within a rubber tube J by means of a clamp K, and the said rubber tube is closed by means of a rod L of glass. At the bottom of the jacket C there is a small projection D providing a support for the bottom part of the tube E.

In the operation of the apparatus the jacket C and the bottom part of the tube E are first heated to the desired temperature by means of heating gases circulating through the chamber B, the temperature being examined by means of a pyrometer. The lateral branch $F^1$ is connected with a suitable receptacle adapted to collect the gases developed from the coal and the inner part of the system is closed against the atmosphere. The bricks M are placed on the platinum wire N and inserted into the pipe F, whereupon the pipe F is again closed by means of the stopper G. The bricks M may have a weight of two grammes each, so that in the example illustrated in Fig. 1 the total weight of the bricks is ten grammes. After the apparatus has been thus prepared, and the bottom part of the tube E heated to gasification temperature, the clamp K is opened, so that the platinum wire is released and the bricks M drop into the bottom part of the tube E, where the bricks are always gasified in a uniform way. In the example shown in the figure the jacket C has a high heat storing capacity. Thus the supply of heating gas to the chamber B is interrupted prior to or immediately after allowing the bricks to drop into the bottom part of the chamber E.

The example shown in Fig. 2 is similar to the one shown in Fig. 1, and the same letters of reference have been used to indicate corresponding parts, so that it is necessary only to describe the distinguishing features of the apparatus. In the apparatus shown in the said figure means have been provided for preventing expansion of the bricks by the gases produced therein by gasification. As shown the platinum wire N carrying the bricks is suspended from a steel rod P passing through the glass pipe H and into the tubular member F, the said rod being adapted to be held in elevated position by means of the clamp K. To the rubber tube J a glass pipe O is connected, which is closed at its top and receives the top part of the rod P. After preparing the apparatus in the manner described with reference to Fig. 1, the clamp K is opened, whereupon the rod P and the bricks M drop into the gasification chamber E. Now the rod P bears on the bricks, and it is held in position by means of the clamp K. Preferably the rod P is provided with an enlarged bottom end in order to prevent the bricks from rising at the sides thereof by the pressure of the gases produced therein.

In carrying out the method I have discovered that the longitudinal and lateral expansion of the bricks is reduced when forming the same with grooves and perforations T, the gas produced escaping through the passages provided by the grooves and perforations, so that the pressure thereof is reduced. Further, the gas and tar vapor produced by the gasification are more readily removed from the heating chamber, and they are out of contact with the hot wall of the tube E, so that they are in a less degree decomposed by the heat. Thus the result of the test is made more reliable.

In the drawing I have shown apparatus having vertical gasification chambers but I wish it to be understood that my invention is not limited to this construction, and that in some cases I provide inclined or horizontal gasification chambers. The apparatus may be used for gasifying any kind of bituminous or other fuel capable of developing gas, and coal. Thus, when using the word coal in the specification and claims I wish it to be understood that this word comprises any kind of fuel capable of gasification.

I claim:

1. The herein described method of testing the property of coal to be gasified, which consists in heating a test chamber to gasification temperature, placing into the said chamber a measured amount of coal in brick form, and causing gasification of the coal.

2. The herein described method of testing the property of coal to be gasified, which consists in heating a test chamber and a heat storing jacket surrounding the same to gasification temperature, interrupting heating, and passing a measured amount of coal to be tested into the said chamber.

3. The herein described method of testing the property of coal to be gasified, which consists in heating a test chamber to gasification temperature, placing into the said chamber a measured amount of coal in the form of bricks combined into a coherent body, and causing gasification of the coal.

4. The herein described method of testing the property of coal to be gasified, which consists in heating a test member to gasification temperature, combining a plurality of bricks of coal to be tested into a coherent body, connecting the bricks by a wire passed through the same, and placing the body thus produced into the gasification chamber.

5. The herein described method of testing the property of coal to be gasified, which consists in heating a test chamber to gasification temperature, placing into the said chamber a measured amount of coal in the form of bricks combined into a coherent body, causing gasification of the coal, and preventing expansion of the bricks during gasification.

6. An apparatus for testing coal to be gasified, comprising a test receptacle adapted for communication with a container for collecting gas and provided with means for closing the same, heating means for said receptacle, and releasable means for suspending bricks of coal within said test receptacle.

7. An apparatus for testing coal to be gasified, comprising a heating apparatus, a tubular gasification receptacle made from refractory material and having a closed end and disposed vertically and with its closed end within said heating apparatus, a pipe connected with said receptacle near the top end thereof for removing gas therefrom, means for closing said receptacle at its top and provided with means for suspending a brick carrying wire therefrom, and means to release said wire.

8. An apparatus for testing coal to be gasified, comprising a heating apparatus, a tubular gasification receptacle made from refractory material and having a closed end and disposed vertically and with its closed end within said heating apparatus, a pipe connected with said receptacle near the top end thereof for removing gas therefrom, means for closing said receptacle at its top, said closing means comprising a vertical pipe communicating with said receptacle and comprising a flexible portion, and a clamp engaging said flexible portion and adapted to hold a brick supporting wire.

9. An apparatus for testing coal, comprising a gasification receptacle made from refractory material, heating means for a part of said receptacle, a pipe connected with said receptacle for removing the gas therefrom, means for closing said receptacle, and means for compressing bricks of coal within said receptacle.

10. An apparatus for testing coal, comprising a gasification receptacle made from refractory material, heating means for a part of said receptacle, a pipe connected with said receptacle for removing the gas therefrom, means for closing said receptacle, a rod passed into said receptacle and adapted to compress bricks of coal placed therein, and means to fix said rod in compressing position.

11. An apparatus for testing coal, comprising a gasification receptacle made from refractory material, heating means for a part of said receptacle, a pipe connected with said receptacle for removing the gas therefrom, means for closing said receptacle, a rod passed into said receptacle and adapted to compress bricks of coal placed therein, and means to fix said rod in compressing position, said rod being enlarged at the brick engaging end.

12. The herein described method of testing the property of coal to be gasified, which consists in heating a test chamber to gasification temperature, placing into the said chamber a measured amount of coal in the form of a brick having passages formed with gas passages, and causing gasification of the coal.

13. The herein described method of testing the property of coal to be gasified, which comprises heating a test chamber to gasification temperature and placing into said chamber a measured amount of coal such that the length of the column of coal is at least double the inner diameter of said chamber.

In testimony whereof, I hereunto affix my signature.

RUDOLF GEIPERT.